Feb. 16, 1960
J. B. HUFF ET AL
2,925,578
PROBE CIRCUIT CLOSER
Filed April 16, 1956
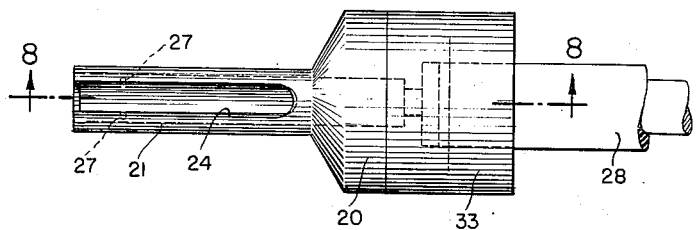
Fig. 1.
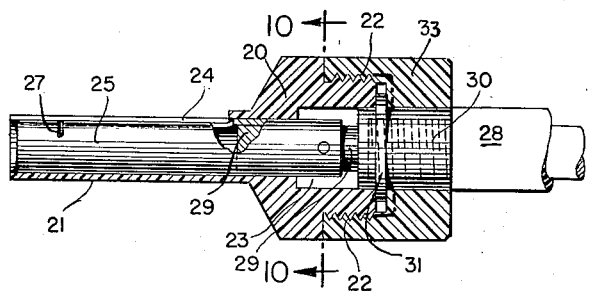
Fig. 2.
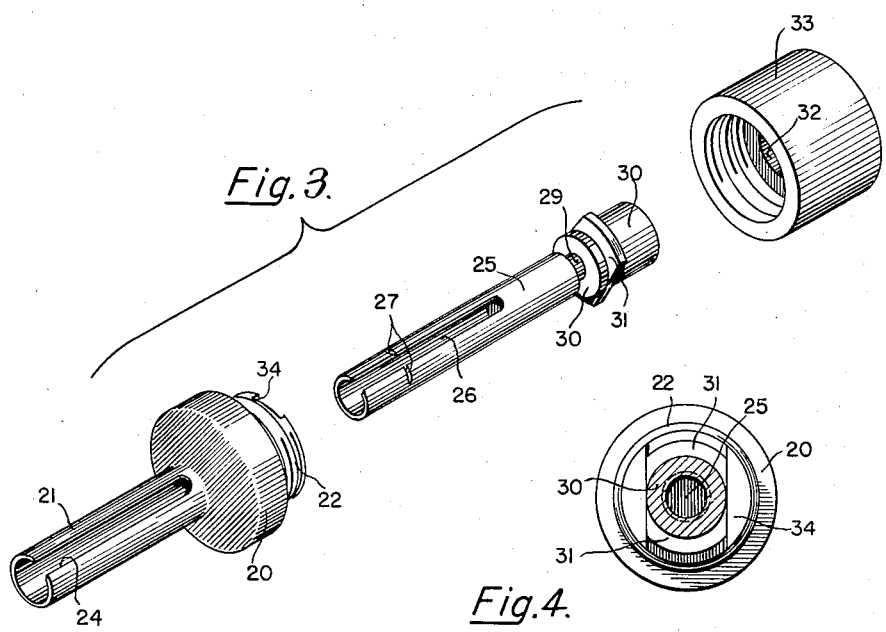
Fig. 3.
Fig. 4.
INVENTORS
JOHN B. HUFF
LARRY L. WOLFF
BY
ATTORNEY

United States Patent Office 2,925,578
Patented Feb. 16, 1960

2,925,578

PROBE CIRCUIT CLOSER

John B. Huff and Larry L. Wolff, Malvern, Pa., assignors to Burroughs Corporation, Detroit, Mich., a corporation of Michigan Application April 16, 1956, Serial No. 578,463

2 Claims. (Cl. 339—209)

The present invention relates to circuit closers and more particularly to a closer for connecting a test circuit to any one of a plurality of closely assembled circuit terminals.

In circuit closers of the type used for connecting the terminal of an external circuit, such as for testing, to one of a number of terminals in a restricted area, it has been the general practice to employ a spring clip, commercially known as "alligator clips," for attaching to a selected circuit terminal. Since these clips are made of conducting material, care must be taken to prevent short circuiting with adjacent terminals when attaching the clip for a test or otherwise. Such short circuitry is caused either because the clip has slipped during a test and made accidental contact with an adjacent prong or terminals, or technicians may fumble the clip and inadvertently touch a neighboring contact.

An object of the present invention is to provide a circuit closing probe wherein the danger of making short circuits is eliminated when applying the probe.

Another object is to provide a novel circuit closing probe for testing operations, particularly those related to wired circuits with closely spaced terminal contacts and contacts in restricted areas.

Another object is to provide a contactor for a clip-on circuit closer wherein insulation protects the contactor from contacting adjacent live circuit terminals.

A further object is to provide a circuit closing probe for telescopic connection to a selected circuit terminal by straddling connected wires wherein means functions to prevent short circuits with adjacent terminals or the like.

A further object is to provide a push-on circuit closure having guide means for accurate connection to a wired terminal contact.

Other objects, advantages, and meritorious features of the invention will become more fully apparent from the following specification, appended claims and accompanying drawings wherein:

Fig. 1 is a side view of a circuit closing probe embodying the invention;

Fig. 2 is a medial axial section of the probe of Fig. 1;

Fig. 3 is an exploded perspective view of the probe of Fig. 1. showing the several associated parts; and Fig. 4 is a sectional view on line 4—4 of Fig. 2.

Referring to the drawings showing a preferred form of the invention it is seen that the probe is formed by a tubular body 20 of dielectric material having an integral axially disposed sleeve 21 at one end and an externally threaded portion 22 at the other end having a counterbore 23. The sleeve 21 has a lengthwise side slot 24 paralleling its axis for flexibility and for mating telescopic attachment to any one of a number of closely spaced terminal wired contacts. The diameter or width of the sleeve 21 is such as to enter freely in the space between adjacent terminals contacts. The sleeve 21 serves as a protecting insulating guard for the contactor 25 which, in this instance, is a tube of conducting material dimensioned to fit snugly within the sleeve 21 but terminating just short of the contact receiving end of the sleeve 21 in order to eliminate the danger of short circuitry with adjacent terminals. A slot 26 is formed lengthwise in the contactor 25 for complemental matching with the slot 24 in the sleeve. A transverse cut 27 is made across the slot 24 in close proximity to the contact receiving end of the contactor for biased gripping action.

For connecting the contactor 25 to a conductor 28, its inner end is pinned or otherwise made fast to the stem 29 of a cylindrical head 30 which has diametrically disposed arcuate segment flanges 31 located to lie in the plane of the contactor slot 26 as a guide for registering the slot 26 with the sleeve slot 24. These flanges 31 are intermediate the ends of the head 30 so that the inner end of the head seats in the counter-bore 23 while the outer end seats in the bore 32 of a cap 33 of dielectric material threaded over the body portion 22. It should be noted that the outer end of the portion 22 is formed with a diametrically disposed groove 34 forming a seat for the head flanges 31 to thereby prevent relative turning of the contactor 25 as well as holding the slots 24 and 26 in register. Preferably the head 30 is internally threaded for attaching the end of the conductor 28. Thus with the parts of the probe assembled the body 20 and the cap 33 forms a cylindrical body of convenient size for grasping while pushing the contactor into circuit closing position. This connecting operation is made possible by the two registered slots 24 and 26 which can straddle any wire attached to the wired terminal while also serving to visibly guide the probe to attached position.

It will now be apparent that a complete circuit closing unit, in the form of a push-on probe, has been devised wherein the danger of shorting the probe contactor with adjacent circuit terminals has been eliminated. This is an important advance in plug-in closers because heretofore type closers or clips being uninsulated often accidently contact adjacent circuit contacts and thus result in costly circuit breakdown or other damage. Furthermore where the circuit terminals are parts of a wired circuit the probe is still effective for push-on connection because the provided slot or slots will straddle the terminal wires.

What is claimed is:

1. A circuit probe of the plug-in type, comprising a tubular body of dielectric material having a counterbored and threaded portion at one end, a sleeve of dielectric material attached to its other end and having an inlet opening, a contactor formed by a head and an open ended tubular extension, said head seating in said counterbore and said extension fitting within said sleeve with its free end adjacent to the inlet opening of said sleeve to receive an inserted terminal contact, the walls of said sleeve having a slot extending inwardly from the inlet opening thereof, and said tubular extension of said contactor having a slot extending inwardly from its open end and in registry with the slot in said sleeve thereby to straddle a wire attached to a terminal contact, a cap of dielectric material threaded on the threaded portion of said tubular body, and an electrical conductor extending through said cap and bonded in electrically conductive relation to the head of said contactor.

2. A circuit probe of the plug-in type, comprising a tubular body of dielectric material having a counterbored and threaded portion at one end, and an elongated sleeve of dielectric material attached to its other end and having an inlet opening at its free end, an electrical contactor formed by a head and an open ended tubular extension, said head seating in said counterbore and said extension fitting within said sleeve with its free end adjacent to the inlet opening of said sleeve to receive an inserted terminal contact, the walls of said sleeve having a slot extending inwardly from the inlet opening thereof, and said tubular extension of said contactor having a slot extending inwardly from its open end and in registry with the slot in said sleeve thereby to straddle a wire attached to a terminal contact, a tubular cap of dielectric material threaded on the threaded portion of said tubular body and having a portion cooperating with the end of said threaded portion to secure said contactor within said tubular body and said sleeve, and an electrical conductor extending through said cap and secured in electrically conductive relation to the head of said contactor.

References Cited in the file of this patent

UNITED STATES PATENTS

| | | |
|---|---|---|
| 950,899 | Dods | Mar. 1, 1910 |
| 2,393,083 | Wisegarver | Jan. 15, 1946 |
| 2,654,076 | Hudlow | Sept. 29, 1953 |

FOREIGN PATENTS

| | | |
|---|---|---|
| 634,404 | France | Nov. 18, 1927 |

UNITED STATES PATENT OFFICE

CERTIFICATE OF CORRECTION

Patent No. 2,925,578                                February 16, 1960

John B. Huff et al.

It is hereby certified that error appears in the above numbered patent requiring correction and that the said Letters Patent should read as corrected below.

In the drawings, Fig. 1, delete line 8-8; Fig. 2, change line 10-10 to 4-4.

Signed and sealed this 27th day of September 1960.

(SEAL)
Attest:

KARL H. AXLINE
Attesting Officer

ROBERT C. WATSON
Commissioner of Patents